Oct. 30, 1962 J. J. BORELL Re. 25,278

MUSICAL INSTRUMENT

Original Filed Oct. 15, 1957 2 Sheets-Sheet 1

INVENTOR
JAMES J. BORELL

BY [signature]
ATTORNEY

MUSICAL INSTRUMENT
Original Filed Oct. 15, 1957 2 Sheets-Sheet 2
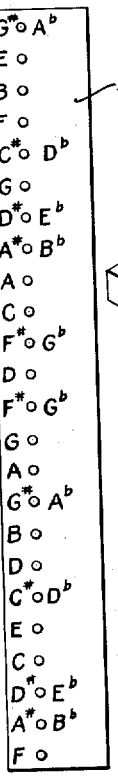
FIG. 4
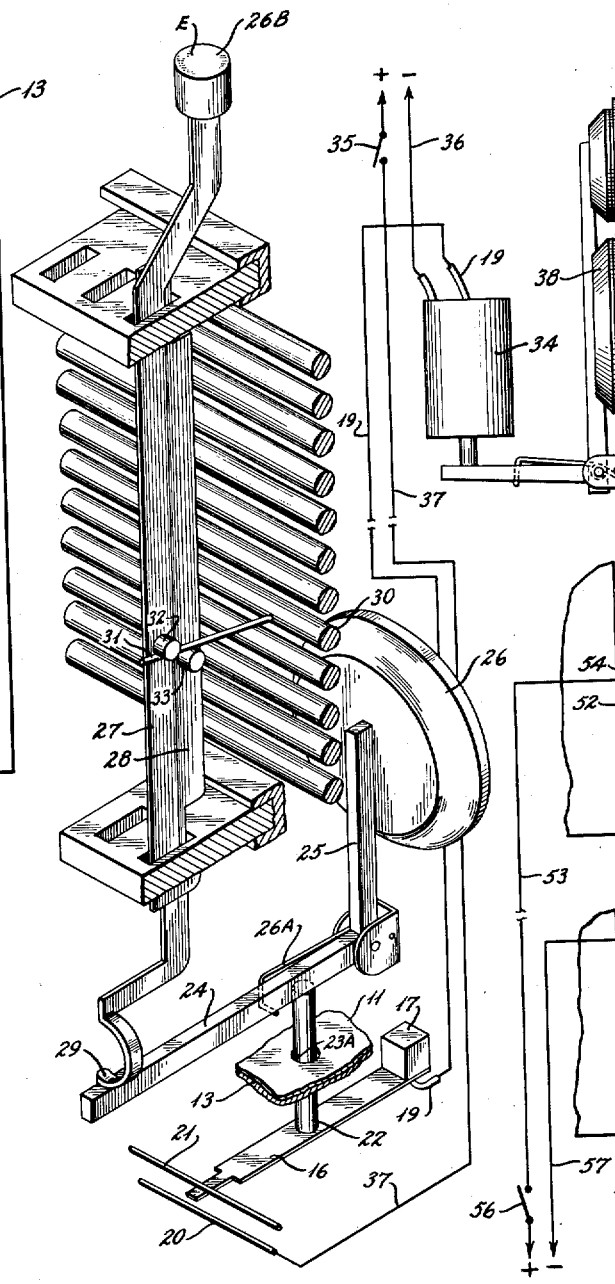
FIG. 5
FIG. 6
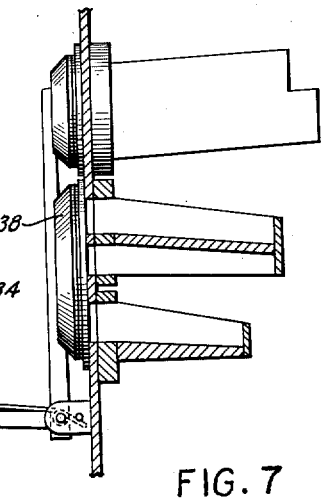
FIG. 7
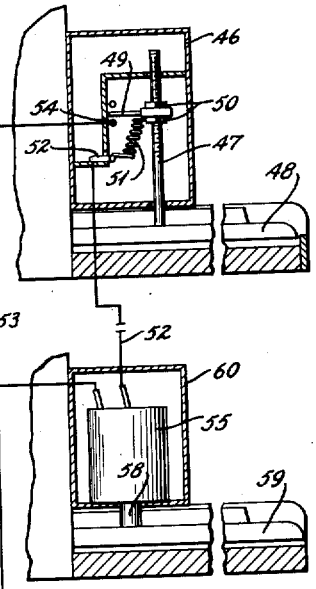
FIG. 8
INVENTOR
JAMES J. BORELL
BY J. J. Borell
ATTORNEY United States Patent Office Re. 25,278
Reissued Oct. 30, 1962

25,278

MUSICAL INSTRUMENT

James J. Borell, Orlando, Fla., assignor to Iorio Instruments, Inc., Jamaica, N.Y., a corporation of New York Original No. 2,971,421, dated Feb. 14, 1961, Ser. No. 690,311, Oct. 15, 1957. Application for reissue Feb. 13, 1962, Ser. No. 173,859
11 Claims. (Cl. 84—171)

Matter enclosed in heavy brackets [ ] appears in the original patent but forms no part of this reissue specification; matter printed in italics indicates the additions made by reissue.

The present invention relates to musical instruments and more particularly to keyed instruments in which two instruments capable of producing musical tones are connected together so that upon actuating the keyboard of one instrument either or both of the instruments may be played.

Heretofore various proposals have been made to provide connections between two instruments for simultaneously playing both but such proposals have not been satisfactory with portable instruments and the complicated structures required have not met with general acceptance and did not lend themselves to ready attachment to existing instruments without complicated alterations.

Further, the prior devices have not provided means to play chords on a second multi-note [producing] instrument upon playing the chords on a first instrument such as an accordion which produces the chord by the depression of a single button or key.

The object of the present invention is to overcome the difficulties of the prior art and to provide means for playing one instrument from another to produce chords in the other instrument upon actuation of a single chord-producing actuating means, [in the said one instrument] such as a push button, *in the said one instrument.*

A further object is to provide a lightweight attachment to accordions whereby an accordion may be played and a second instrument such as an electric organ will be played simultaneously.

A further object is to provide a simple attachment to an accordion which can be applied by relatively unskilled persons and which will be effective for playing a second instrument.

Figure 1:
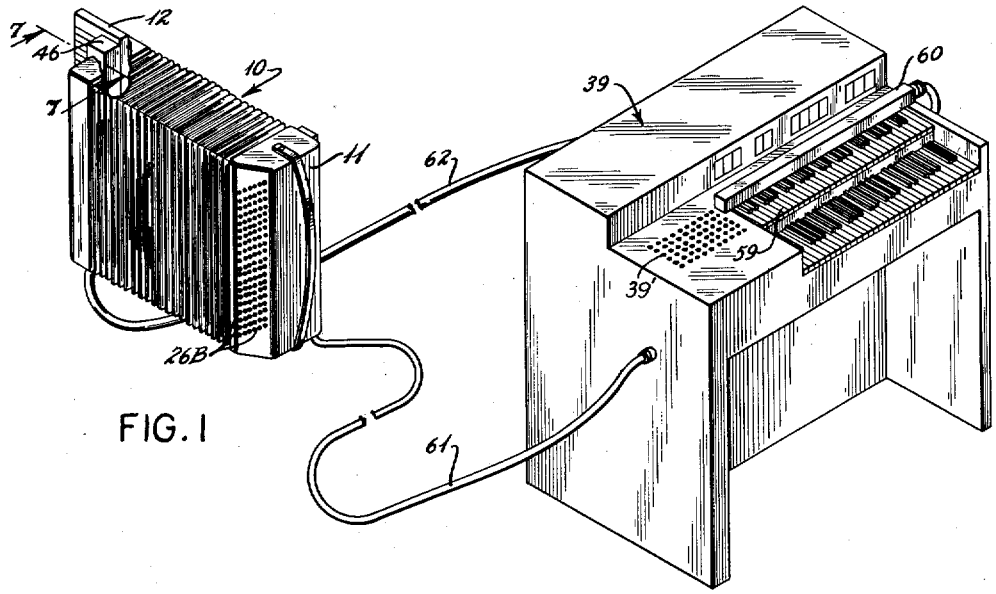
Figure 2:
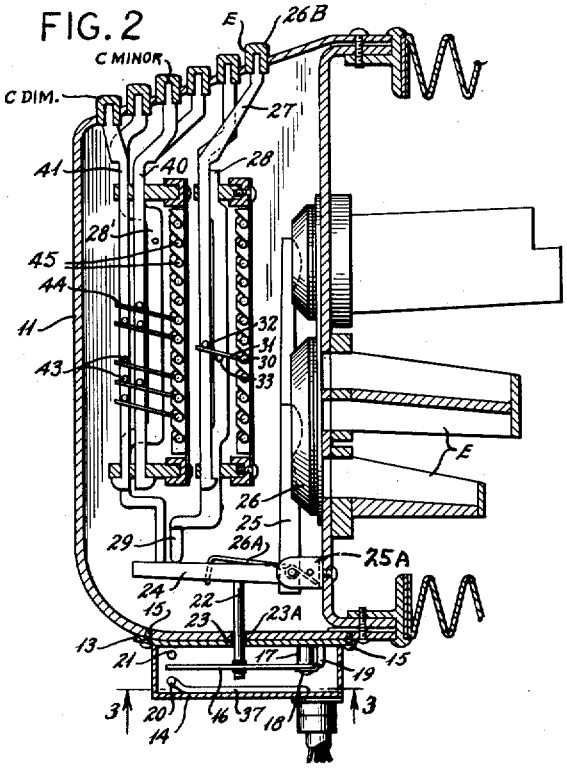
Figure 3:
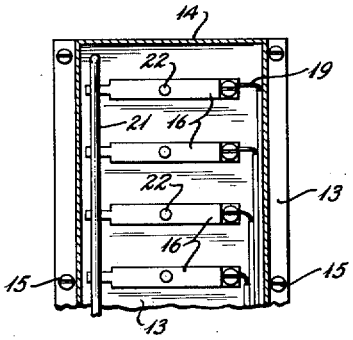

Further objects will be apparent as the description proceeds and upon reference to the [drawings] *drawing* wherein:

FIG. 1 is a perspective view of an accordion and an electric organ with the present invention applied so that upon actuating the accordion keyboard the organ may also play;

FIG. 2[,] *is* a fragmentary horizontal section through one row of piston buttons or keys of the bass portion of an accordion shown in FIG. 1;

FIG. 3[,] *is* a fragmentary section of the electric switch structure and wire leads taken substantially on line 3—3 of FIG. 2;

FIG. 4[,] *is* a plan view of a rod-guiding base plate of the attachment showing the apertures with the designation of the keys for operation of the switches;

FIG. 5[,] *is* a fragmentary perspective view of a portion of the bass section of the accordion of FIG. 2, showing how one note is produced by one of the piston buttons and showing the operation of one of the valves and the actuation of the associated switch with the wire leads therefrom;

FIG. 6[,] *is* a fragmentary detail of a modified [form] *embodiment* of *the* invention utilizing a reed organ, [and] showing the solenoid operation of a valve thereof and the wiring cooperating with the switch shown in FIG. 5;

FIG. 7[,] *is* a fragmentary section taken on line 7—7 of FIG. 1, showing the switch housing applied to the keyboard for the upper notes of an accordion with the switch structure and wire leads therefrom; and FIG. 8[,] *is* a fragmentary section taken on line 8—8 of an attachment to the organ shown in FIG. 1, showing the solenoid operation of the keys of the organ with the leads cooperating with the leads from the switch shown in FIG. 7.

Briefly stated, the present invention comprises an accordion-type instrument such as an accordion of conventional construction with the bass section [being] provided with a plurality of electrical switches corresponding to the number of valves or actuators in the bass section and with means to operate such switches from such valves or actuators by suitable push rods on the switches operable with or engaging the operating lever for the associated valve or actuator. The valves in the bass section are operated by the conventional piston buttons, action pistons, action shafts, pusher pins, pusher bars, and valve lever arms.

Each piston button in the bass or counterbass rows controls a single valve while each piston button in the major chords, in the minor chords, in the sevenths and in [diminishing] *diminished* chords controls a plurality of valves or actuators and switches. The higher notes played with the right hand have switches operated when the keys are depressed, such switches being mounted in removable housing. For operating each switch from its bass valve or actuator, an electrical switch rod extends into contact with the operating lever for the associated valve or actuator, the electrical switch rod being connected to the electrical switch blade, with the electrical switch blade serving as a spring to urge the electrical switch blade to open position. The playing of chords in an accordion by the depression of a chord-piston push button causes the actuation of a plurality of valves or actuators which open corresponding valves as is well known in the art. In the present invention an electrical switch is operated by each valve or actuator when the corresponding valve is opened. It will be noted that a single valve or single actuator provides for the actuation of several reeds such as reeds giving a note in one octave and the same note in another octave in the instrument being played. Similar actuators for producing a particular note are provided in a second or third instrument, which actuators in the second or third instrument are operated by a particular switch in the first instrument, [which] *the* first instrument [is] *being* shown [to be] *as* an accordion. Solenoids are provided for operating the keys of the organ to be simultaneously played as well as operating the note-producing means of the bass section of the organ. It will therefore be evident that the playing of the accordion will result in simultaneous playing of the organ, suitable electrical conductors or leads being provided to carry the current from the actuating electrical

[swithces] *switches* to the corresponding note-producing means.

Upon more detailed reference to the [drawings] *drawing,* the present invention is shown applied to a conventional accordion 10 having a bass-section cover 11 and having the conventional keyboard 12 for playing the upper notes. To the back of the base-section housing 11, a plate 13 having a removable switch housing 14 thereon is secured to the accordion bass section by suitable fastening elements 15. Resilient cantilever blades 16 are secured on an insulating support 17 to which the blades are attached by insulated bolts 18 from which its associated lead 19 extends, the support 17 being mounted on plate 13 and bolts 18 being connected to their associated blades 16 and insulated from the plate and housing. A hot contact rod or bus bar 20 is supported by suitable insulating means in the position shown while a stop rod 21 limits the opposite movement of the blade 16. Each switch blade 16 has a [slideable] *slidable* rod 22 fixed thereto with such [slideable] *slidable* rod passing through registering openings 23 through plate 13 and through the openings 23A in the back of the bass housing 11, each rod extending to and contacting one arm 24 of a valve-operating bell-crank lever, the other arm 25 of the bell-crank lever being fixed to a valve pad 26 of conventional design, such valve pad closing one of the openings—for example, the opening which forms the note E. The bell-crank lever 24, 25 is pivoted at its knee on a suitable bracket 25A and is urged by a spring 26A to close the valve. The E piston button 26B mounted on an action piston 27 is [slideably] *slidably* guided in conventional guides while a pusher bar 28 associated therewith is [slideably] *slidably* mounted in a well-known manner. A foot 29 on pusher bar 28 engages the lever arm 24 for operating the corresponding valve.

A shaft 30 is oscillatably mounted in suitable guides in a well-known manner such as shown in U.S. Patent 2,556,-408 to Ahern et al. Extending outwardly from the action shaft 30 are one or more pusher pins 31, one of which is shown with its outer end below a projection 32 on the action piston 27 while the pusher bar 28 is provided with a projection 33 below the said one pusher pin 31. It will therefore be evident that upon depression of the E key 26B the action piston 27 moves rearwardly so that projection 32 strikes pusher rod 31 which [pusher rod] contacts projection 33, moving pusher bar 28 downwardly as viewed in FIGS. 2 and 5, causing foot 29 to move bell-crank lever 24, 25, thereby opening the valve covered by pad 26[,] *and* causing the note to be played by the accordion. The motion of lever 24 causes push rod 22 to move switch-lever blade 16 into contact with the hot wire 20, thereby completing a circuit to lead 19. Lead 19 is continued to corresponding note-producing means within an electric organ 39 having a bass and chord section 39' or a solenoid 34 on a reed organ which is energized by completion of a circuit from a source of power through a lead to and controlled by a main switch 35 to a lead 37. The negative or ground wire or lead 36 is connected to the other end of the note-producing means or the solenoid winding 34, the lead 37 [extends] *extending* from the switch 35 to the hot contact wire 20 on the accordion. It will therefore be evident that when switch 35 is closed and the accordion E key 26B is actuated, the corresponding note will be played by the note-producing means on the electric organ 39 or the solenoid 34 opening the valve 38 to a reed on a wind or reed organ.

The chords are played in a similar manner—for example, the minor chord would be played by the C-minor key which actuates a piston action 40 which [piston action carries 3] *carrying three* projections which cooperate with certain of the pusher rods 44, [which] *these* pusher rods [are] *being* connected to suitable shafts 45 which [shafts] carry other pusher rods 44 which contact the proper action bar 28' to open the valves or operate the actuators which would play C, E flat and G[,] as is well understood in the art. The C-[diminishing] *diminished-* chord key is connected to an action piston 41 which carries a plurality of projections 43 located above certain pusher rods 44, whereby such pusher rods are operated to rotate the corresponding shafts 45 which have pusher bars over the selected valves or operate the actuators to open the valves which play the notes C, E flat, G flat and A, thereby producing the C-[diminishing] *diminished* chord.

It will be evident that each one of the valves is similar to the valve 26 and the lever 24 of each bell crank contacts its associated electrical switch push rod 22 to close the corresponding electrical switch blade 16 with the hot contact 20, thereby energizing the corresponding lead 19 which is connected to operate the corresponding note-producing means of the bass and chord section in the organ.

The treble or upper notes on the keyboard 2 of the accordion serve to operate suitable switches such as that shown in FIG. 7. Over the keyboard 12 an elongated switch housing 46 is mounted by any suitable means, such switch housing extending the length of the keyboard and being in position closely adjacent the inner ends of the keys to avoid interference with the playing of the accordion.

To close circuits when the keys in the treble portion of the accordion are depressed, [a] *the* switch housing 46 is mounted on the accordion overlying the inner ends of the keys. A Z-shaped member extends substantially the length of the switch housing 46, [with] one foot thereof being provided with a series of apertures through which rods 47 pass, such rods projecting through and *being* slidable in registering apertures in the top flange of the Z-shaped member and in the bottom wall of the housing 46 [and] *with* the bottom [end] *ends* of such rods engaging the corresponding key 48 of the keyboard. Suitable means are provided to prevent rotation of rods 47 so that the blades 49 carried thereby will be maintained in operative position. Such key 48 may be a full note or a half note. Insulatingly mounted on each rod 47 is a switch blade 49 which is held in adjusted position by means of nuts 50 threaded onto a threaded portion of a rod 47 with suitable insulating washers thereon. A coiled flexible lead-wire spring 51 extends from each blade 49 to a corresponding individual lead 52. A common lead or hot wire 53 extends to a hot contact bar 54 insulatingly mounted on the Z-shaped frame within the housing 46. Each blade 49 is connected through its associated tension coil spring 51 to the lead 52 which extends to a solenoid 55. The hot lead 53 extends to a switch 56 connected to a supply of current shown as positive. The negative or ground is supplied through a lead 57 to the solenoid 55, thereby completing the circuit when a switch blade 49 is closed and switch 56 is closed. It will therefore be evident that when the key 48 is depressed in playing the higher notes of the accordion the rod 47 moves downwardly [due to] *by virtue of* the resilient tension of the coil spring 51 closing the contact between the blade 49 and the hot contact bar 54, thereby completing a circuit to the solenoid 55 which [solenoid 55] is actuated to project the core 58 downwardly to depress the corresponding key 59 on the organ. A housing 60 is provided for receiving the solenoids 55 and serving as a mounting for the solenoids 55 which actuate the keys of the organ.

It will therefore be evident that the playing of the accordion bass and the accordion treble notes results in [simultaneously] *simultaneous* playing of the same notes in the organ 39 and therefore the playing of the accordion instrument can produce [simultaneously] *simultaneous* playing of the organ. Further, the accordion may be played without motion of the bellows [and] *whereby* the organ alone would be [played] *sounded.* Secondly, with this arrangement numerous variations can be obtained by the skill of the accordionist.

It will also be evident that the accordion may be played independently of the organ by merely opening switches 35 and 56 and therefore the accordionist can obtain accordion-[sole]*solo* effects, organ-solo effects and organ-and-accordion-duet effects.

It will be evident that the cables 61 and 62 which extend from the accordion 10 to the organ 39 have one lead for each key or note and a common hot lead. The cables may be provided with plugs of well-known type to permit removal of such cables whereby the accordion may be played alone and carried from place to place. It will also be evident that various other instruments such as piano, chimes, bells and the like may be provided with solenoids or other electric note-producing means so that the accordion may play any of the instruments provided with the corresponding electric actuating means for the various keys. Also the instrument supplied with the electric note-producing means may be played in the usual manner as the switches on the accordion do not interfere with the normal operation thereof.

With the construction shown in FIG. 8, the housing 60 is made of the desired length and the solenoids 55 are positioned in accurate spaced relation to cooperate with the keys of a standard keyboard, whereby the housing 60 with the solenoids therein can be applied as a readily removable attachment to existing pianos, organs and similar key-operated instruments, since the width of each key in a standard keyboard is constant.

It will be obvious to those skilled in the art that various changes may be made in the invention without departing from the spirit and scope thereof and therefore the invention is not limited by that which is illustrated in the [drawings] *drawing* and described in the specification, but only as indicated in the accompanying claims.

What is claimed is:

1. In combination a multi-note [producing] instrument having note-producing circuits, an accordion-type instrument having a chord-producing portion wherein a single button has a plurality of actuators for operating a plurality of note-producing means, *and* circuitry interconnecting said actuators with the corresponding circuits in said multi-note [producing] instrument, whereby the actuation of a single chord button on said accordion-type instrument will directly produce corresponding tones in said multi-note [producing] instrument.

2. The invention according to claim 1 in which each actuator in the accordion-type instrument operates an electrical switch closing such electrical switch when the actuator is operated by a push button, and the multi-note [producing] instrument is provided with circuits energized by such switches to produce the tone corresponding to the tone produced by the actuator in the accordion-type instrument.

3. The invention according to claim 2 in which the circuit in the multi-note [producing] instrument includes solenoids and the solenoids operate the actuators in the multi-note [producing] instrument to thereby produce the corresponding notes in the multi-note instrument.

4. The invention according to claim 1 in which the circuitry includes one switch for each actuator of the accordion-type instrument, leads adapted to be connected to a source of electrical energy, *and* a lead *extending* from each switch of the accordion-type instrument to an actuator for the note-producing means in the multi-note [producing] instrument and *in which* main control-switch means are provided whereby the accordion-type instrument may be played with the circuits open between the accordion-type instrument and the multi-note [producing] instrument, thereby producing sounds only from the accordion-type instrument, and[,] alternatively, the accordion-type instrument may be maintained in non-sound-producing relation with the switch means closed between the accordion-type instrument and the multi-note [producing] instrument, thereby playing only the multi-note [producing] instrument.

5. The invention according to claim 1 in which means are provided for rendering the interconnecting circuitry between the accordion-type instrument and the multi-note [producing] instrument inoperative.

6. In combination, [a multi-note producing instrument having note producing circuits therein corresponding to the individual notes producible on an accordion.] an accordion having a chord-producing portion wherein a single piston button operates a plurality of actuators for operating a plurality of valves communicating with the reeds in the accordion for producing a plurality of notes forming a chord simultaneously, a second instrument having means for producing a plurality of notes corresponding to the individual notes produced by each valve of the accordion, an electrical switch [operatable] *operable* by the opening of each valve of the accordion, note-producing means in the second instrument corresponding to each valve and connected to the switch of the corresponding valve of the accordion, and leads adapted to be connected to a source of power and interconnecting means in the second instrument whereby the operation of the valves of the accordion will simultaneously cause the production of the corresponding notes in the second instrument, whereby the pressing of a chord-producing piston button in the accordion will cause the production of the same chord in the second instrument.

7. The invention according to claim 6 in which the accordion has treble keys that operate switches and the second instrument is provided with a keyboard and keys spaced in accurate relation and a housing is mounted over the keyboard, a plurality of solenoids corresponding to the keys of the keyboard of the second instrument, *and* armatures operated by said solenoids for operation of said keys of the keyboard of said second instrument, [and] the treble-key switches of said accordion being connected to the corresponding solenoids of the second instrument, whereby playing of the treble keys of the accordion produces operation of the solenoids of the second instrument and production of the corresponding tones therefrom.

8. The invention according to claim 6 in which main switch means are provided between said accordion and said second instrument to provide for playing of either said accordion or said second instrument individually or together by the operation of the keys and buttons of the accordion.

9. The invention according to claim 6 in which main switch means are provided for rendering said second instrument inoperative or [to render] *rendering* said second instrument operative.

10. In combination, a multi-note [producing] instrument having corresponding note-producing circuits, an [accordian] *accordion*-type instrument having treble keys and a chord-producing portion wherein a single button of the chord-producing portion has a plurality of actuators for operating a plurality of note-producing means, circuitry interconnecting said actuators with corresponding circuits in said multi-note [producing] instrument whereby the actuation of a single chord button on said accordion-type instrument may produce corresponding tones in said multi-note [producing] instrument, an individual switch on said accordion-*type instrument* for each treble key and a solenoid housing mounted over the corresponding keys of the keyboard of the multi-note [producing] instrument with circuits interconnecting corresponding switches of the treble keys of the *accordion-type* instrument with the solenoids of the corresponding keys of the multi-note [producing] instrument whereby closing the switches in the accordion-type instrument by operation of the treble keys will actuate the corresponding circuits and thereby actuate the corresponding keys and produce the corresponding notes in the multi-note [producing] instrument.

11. The combination of a first multi-note [producing] instrument having a chord-producing portion and note-producing circuits, wherein a single button has a plurality of actuators for operating multiple note-producing means, *with* an electrical multi-note [producing] instrument having corresponding note-producing circuits, *and* circuitry interconnecting the actuators on said first multi-note [producing] instrument with the corresponding circuits in said electrical multi-note [producing] instrument whereby the actuation of a single button on said first *multi*-note [producing] instrument will produce corresponding tones in said electrical multi-note [producing] instrument.

References Cited in the file of this patent or the original patent

UNITED STATES PATENTS

| | | |
|---|---|---|
| 1,347,977 | Weber | July 27, 1920 |
| 1,622,364 | Barbieri | Mar. 28, 1927 |
| 1,696,960 | Libiez | Jan. 1, 1929 |
| 1,727,127 | Mills | Sept. 3, 1929 |
| 1,852,066 | Schwarz | Apr. 5, 1932 |
| 2,056,212 | Schmidt | Oct. 6, 1936 |
| 2,250,065 | Koehl | July 22, 1941 |
| 2,487,977 | Larsen et al. | Nov. 15, 1949 |
| 2,779,225 | Carlson | Jan. 29, 1957 |
| 2,784,633 | Hess | Mar. 12, 1957 |
| 2,832,251 | Hayslett | Apr. 29, 1958 |
| 2,932,232 | Minervini | Apr. 12, 1960 |

FOREIGN PATENTS

| | | |
|---|---|---|
| 695,061 | France | Dec. 11, 1930 |